United States Patent
Koszek

(10) Patent No.: US 11,216,183 B2
(45) Date of Patent: Jan. 4, 2022

(54) ERGONOMIC KEYBOARD USER INTERFACE

(71) Applicant: salesforce.com, inc., San Francisco, CA (US)

(72) Inventor: Wojciech Koszek, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/009,262

(22) Filed: Sep. 1, 2020

(65) Prior Publication Data

US 2020/0393963 A1    Dec. 17, 2020

Related U.S. Application Data

(63) Continuation of application No. 16/579,401, filed on Sep. 23, 2019, now abandoned, which is a continuation of application No. 15/710,356, filed on Sep. 20, 2017, now Pat. No. 10,459,629.

(51) Int. Cl.
    *G06F 3/0488*      (2013.01)
    *G06F 3/02*      (2006.01)
    *G06F 3/023*      (2006.01)

(52) U.S. Cl.
    CPC ........ *G06F 3/04886* (2013.01); *G06F 3/0216* (2013.01); *G06F 3/0236* (2013.01); *G06F 3/0238* (2013.01)

(58) Field of Classification Search
CPC .... G06F 3/0216; G06F 3/0236; G06F 3/0238; G06F 3/04886
See application file for complete search history.

(56) References Cited

U.S. PATENT DOCUMENTS

| | | | | |
|---|---|---|---|---|
| 2010/0156808 A1* | 6/2010 | Stallings | ............ | G06F 3/04886 345/173 |
| 2011/0260998 A1* | 10/2011 | Ludwig | ............... | G06F 3/04166 345/173 |
| 2012/0068917 A1* | 3/2012 | Huang | ............... | G06K 9/00355 345/156 |
| 2014/0267044 A1* | 9/2014 | Andersen | ............ | G06F 3/04886 345/168 |

(Continued)

*Primary Examiner* — Ryan A Lubit
(74) *Attorney, Agent, or Firm* — Sterne, Kessler, Goldstein & Fox P.L.L.C.

(57) ABSTRACT

Disclosed herein are system, method, and computer program product embodiments providing an ergonomic user interface keyboard. An embodiment operates by determining a baseline keyboard interface corresponding to a baseline mobility of a finger of a user. An indication that the finger of the user has sustained an injury with an expected recovery time is received. A new mobility of the finger of the user with the injury is measured. A deviation between the new mobility and the baseline mobility of the finger is determined. An injury keyboard interface is configured with a shifted plurality of keys of the baseline keyboard interface to new positions away from the finger with the injury and towards another finger without the injury based on the deviation. The injury keyboard interface is displayed during the expected recovery time, wherein upon an expiration of the expected recovery time the baseline keyboard interface is displayed.

20 Claims, 7 Drawing Sheets

(56) References Cited

U.S. PATENT DOCUMENTS

| | | | |
|---|---|---|---|
| 2016/0132111 A1* | 5/2016 | Lowe | G01D 5/16 345/156 |
| 2016/0209928 A1* | 7/2016 | Kandur Raja | G06F 3/04886 |
| 2016/0316186 A1* | 10/2016 | Krishnakumar | G06F 3/041 |
| 2016/0364138 A1* | 12/2016 | Luo | G06F 1/1626 |
| 2017/0083230 A1* | 3/2017 | Reddy | G06F 3/005 |
| 2018/0321841 A1* | 11/2018 | Lapp | G06F 3/04886 |

* cited by examiner

ERGONOMIC KEYBOARD USER INTERFACE

CROSS-REFERENCE TO RELATED APPLICATIONS

This application is a continuation of U.S. patent application Ser. No. 16/579,401 titled "Ergonomic Keyboard User Interface", filed Sep. 23, 2019, which is a continuation of Ser. No. 15/710,356 titled "Ergonomic Keyboard User Interface", filed Sep. 20, 2017, both of which are herein incorporated by reference in their entireties.

BACKGROUND

Touchscreen devices, such as tablet computers, have a standard digital keyboard that tries to mimic an ordinary QWERTY keyboard that is difficult to use (relative to an ordinary keyboard). These digital keyboards mimic ordinary device keyboards in that they appear the same regardless of which user is using the touchscreen device. However different users may have different preferences with regard to how they prefer to use these digital keyboards.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing an ergonomic keyboard user interface.

Figure 1:
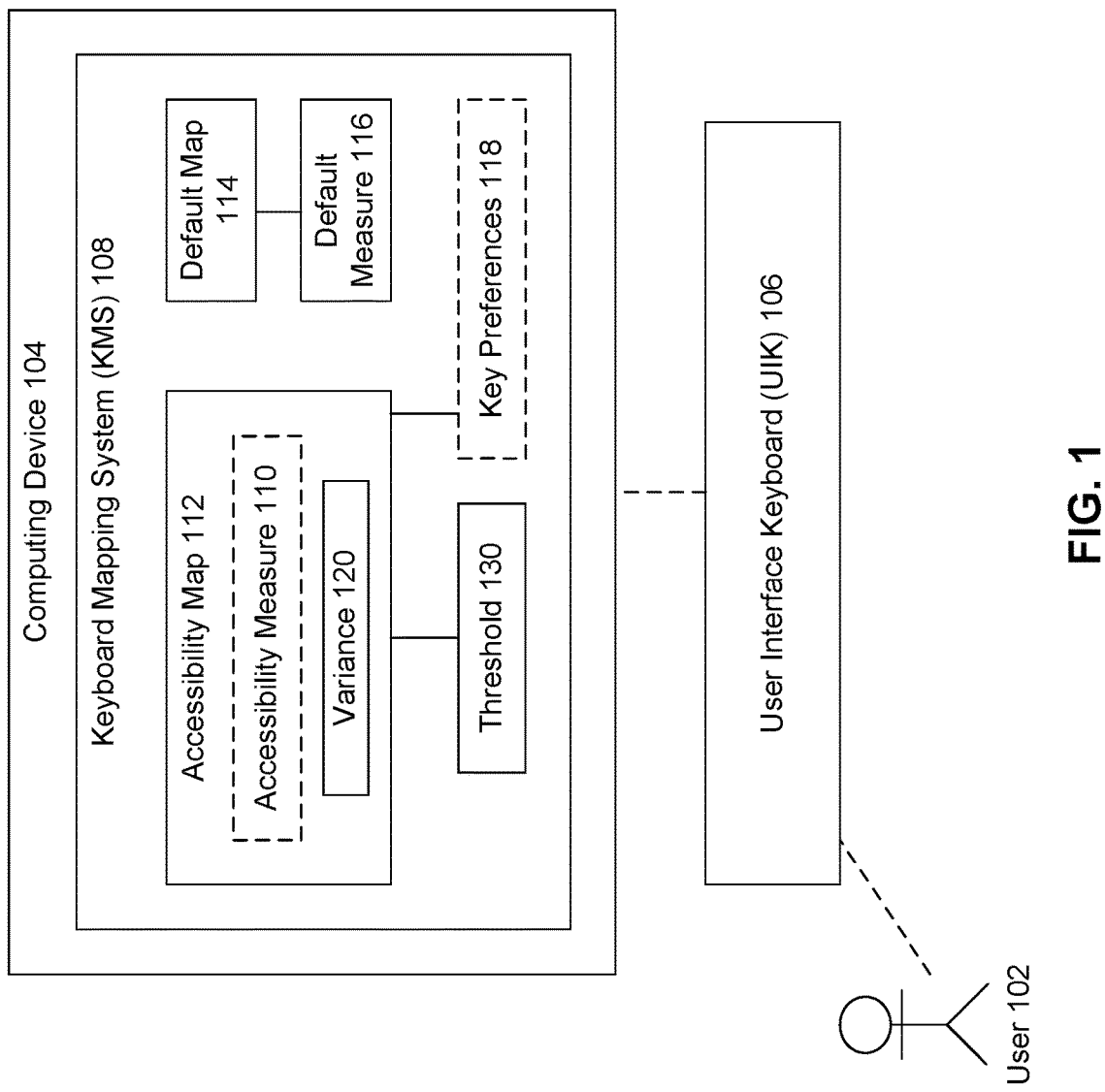
FIG. 1 is a block diagram showing example operations for providing color theme maintenance for presentations, according to some embodiments.

FIG. 1 is a block diagram 100 showing example operations for providing an ergonomic keyboard user interface, according to some embodiments. A user 102 may interact with a computing device 104 using a user interface keyboard (UIK) 106. Computing device 104 may include any computing device that receives alpha-numeric or other input from a keyboard (i.e., UIK 106). Example computing devices 104 include, but are not limited to, mobile phones, laptops, tablets, touchscreen computing devices, navigational systems, monitors, and televisions.

UIK 106 may include any digitally rendered keyboard that is accessible to user 102. In an embodiment, UIK 106 may be rendered on a touchscreen interface of computing device 104. In another embodiment, UIK 106 may be a light-projected keyboard that is projected on another surface (or that is holographic in nature) but is responsive to a user's 102 finger and hand movements.

A keyboard mapping system (KMS) 108 may render or configure UIK 106 any different number of ways depending on the capabilities and/or preferences of user 102. User 102 capabilities may include finger and hand mobility and dexterity in using UIK 106. Depending on which user 102 is operating UIK 106, those keys may be arranged in different orders or sequences.

In another embodiment, KMS 108 may also configure UIK 106 based on which application of computing device 104 (including web-based and cloud based applications) is currently interacting with the keyboard input from UIK 106 or is currently active on computing device 104. For example, different applications or programs operating on or via computing device 104 may require or accept input that varies from the standard keys of a QWERTY keyboard. KMS 108 may configure UIK 106 to display any program-specific keys or keyboards (i.e., UIKs 106). For example, a particular program may have its own UIK 106 that is configured for user 102 in the manner described herein. UIK 106 may be configured on a per-user and/or per-application basis.

In an embodiment, KMS 108 may determine the capabilities, limitations, and/or preferences of user 102. Based on the determined or measured user 102 capabilities or limitations, KMS 108 may arrange and configure the display of UIK 106 accordingly. For example, KMS 108 may measure or test the finger flexibility, mobility and hand placement preferences of user 102 to configure how the keys of UIK 106 are to be arranged or displayed for the user 102.

In an embodiment, user 102 may be missing a finger or may have limited mobility or flexibility in one or more fingers due to injury or another condition. KMS 108 may determine to what extent the injury impacts the user's ability to type or operate UIK 106, and may arrange UIK 106 accordingly. The UIK 106 for the injured user 102 may vary from the UIK 106 for a user 102 with full functionality in all fingers.

Accessibility measure 110 may include one or more values that provide an indication of the physical mobility and/or flexibility in the fingers and hands of user 102. In an embodiment, accessibility measure 110 may be an indication of how far a user can reach or bend with different fingers. KMS 108 may determine, track, measure or compute an accessibility measure 110 for one or more fingers of user 102 in one or both hands.

In an embodiment, KMS 108 may test all of the user's fingers, or user 102 may specify for which finger(s) user 102 wants accessibility measure 110 determined. For example, user 102 may know that a particular finger is injured or have limited mobility, but that the remaining fingers are fine. Then, for example, user 102 may specify that only the injured finger is tested and particularly configured for by KMS 108.

In an embodiment, user 102 may specify a time period in which the particularly configured UIK 106 is to be used as the default UIK 106. For example, if user 102 expects to regain full mobility in the finger within two weeks, user 102 may specify an expiration period for the configured UIK 106 for two weeks. Then after the expiration period, the next time user 102 logs into device 104, user 102 may be presented with UIK 106 for full finger mobility. In an embodiment, KMS 108 may provide a visual indicator that communicates which UIK 106 is being displayed. The visual indicator may indicate which finger(s) are determined to have limited mobility and are being accounted for with UIK 106.

KMS 108 may use different techniques or a combination of techniques to calculate accessibility measure 110. In an embodiment, accessibility measure 110 of a thumb may be measured different from the accessibility measure 110 of the remaining fingers on account of the thumb moving differently (relative to the remaining fingers).

Figure 2:
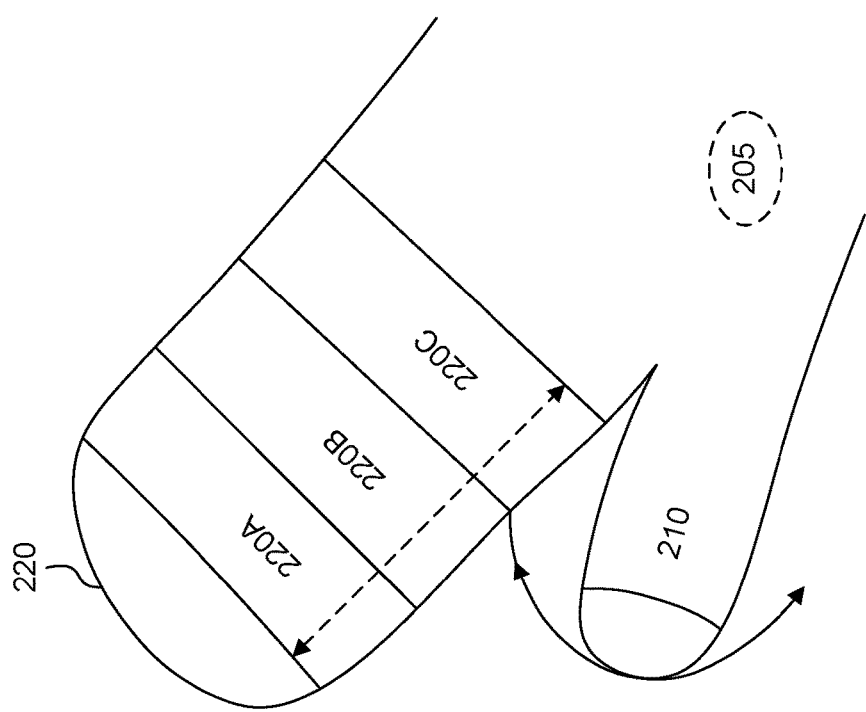
FIG. 2 illustrates an example diagram of how accessibility may be measured for the different fingers of a hand, according to an embodiment.

FIG. 2 illustrates an example diagram 200 of how accessibility may be measured for the different fingers of a hand, according to an embodiment. In an embodiment, the measuring as described herein may be performed on a touchscreen user interface, such that KMS 108 can detect where a user touches in response to various input.

Initialization area 205 may be an indicator where a user 102 is to place the base of their thumb on the palm of their right hand for testing of the right hand and/or fingers by KMS 108. KMS 108 may use initialization area 205 to align the user's hand properly on the measuring display/touchscreen interface before testing begins. In an embodiment, when KMS 108 detects that the user's hand has been placed on initialization area 205, the testing may begin. In another embodiment, different or multiple initialization areas 205 may be used to align a user's hand and/or fingers for testing.

210 illustrates how accessibility measure 110 relative to thumb mobility may be measured by KMS 108. As shown in the example embodiment, accessibility measure 110 of the thumb may be horizontal mobility in a way that movement is natural for the thumb 210.

In an embodiment, KMS 108 may determine a lateral mobility of the thumb, how far left and right the thumb of user 102 can touch or contacts on the interface. For example, the user 102 may be prompted to swipe their thumb left and right multiple times to determine what area or portion of touch screen interface are contacted by or accessible to thumb 210. Accessibility measure 110 for thumb may then be computed as a left angle and a right angle corresponding to left and right movement, or a surface area indicator of what surface area is accessible to the thumb 210.

220 illustrates an example of how accessibility may be measured for the remaining fingers (other than thumb 210). As shown, finger 220 may be measured in terms of vertical flexibility or bendability. In an embodiment, the ability of finger 220 to bend may be divided into three different sections 220A-C. KMS 108 may determine the ease, difficulty, or dexterity of finger 220 based on its ability to bend and touch squares or other areas within each of three different sections 220A-C. The different mobility sections 220A-C may correspond to how much a normal finger can usually bend. However, for users with limited mobility, fewer areas 220A-C may be tested. In another embodiment, horizontal mobility of fingers 220 may be tested as well. Accessibility measure 110 may include one more values indicative of the bendability and/or horizontal mobility of a user's finger(s).

Returning to FIG. 1, a new user 102 who is using computing device 104 may be asked whether the user 102 he wants or needs a custom UIK 106. For example, user with full mobility in all his fingers may opt to use a standard, or un-customized UIK 106 (based on a default map 114). Or, for example, as discussed in greater detail below, the user 102 may still configure UIK 106 based on particular user preferences saved as key preferences 118 with regard to the visual arrangement of the keys of UIK 106.

In an embodiment, if user 102 answers 'yes' requesting a customized UIK 106, KMS 108 may then determine accessibility measure 110 for one or more of the user's fingers. KMS 108 may launch a learning or testing interface (e.g., via a touchscreen device) through which KMS 108 may measure the mobility or accessibility of the fingers of user 102 in each hand (as described above with respect to FIG. 2, as an example).

For example, KMS 108 may prompt user 102 to place the bottom of their right palm in initialization area 205. Upon detecting (through a touchscreen or other sensible user interface) that the user 102 has placed the palm of their hand on initialization area 205 or by receiving a user confirmation, KMS 108 may begin calibrating or measuring the fingers 220 and/or thumb 210 of user 102 on one or both hands. In an embodiment, user 102 may specify which fingers (including thumbs) the user 102 wants measured.

In measuring thumb 210, KMS 108 may prompt user 102 to begin making back-and-forth or left-and-right swiping motions with the thumb and to stretch their thumb as far as possible. Using touchscreen interface, KMS 108 may record or measure the surface area covered through the thumb swiping motions. Or, for example, KMS 108 may prompt user to press various displayed interface buttons with their thumb. KMS 108 may store measurements corresponding to the user's performance as accessibility measure 110 for thumb 210. The performance measures may indicate the time and/or success or accuracy with which the user 102 was able to perform whatever tests were administered.

In an embodiment, KMS 108 may provide a distinguishable user interface button, such as a red triangle, that user 102 may select if the user 102 is missing a thumb or has limited/no mobility in the thumb or other fingers. This selection may be stored as accessibility measure 110 for thumb. In an embodiment, the selection may cause KMS 108 to skip testing of the indicated digit and record that the user 102 cannot use the indicated finger for providing keyboard input. For example, if accessibility measure 110 is a Null, Void, or negative value, KMS 108 may determine that the user is missing or otherwise has no mobility in the given index/finger/thumb. Or, for example, if the user is missing a finger, the accessibility measure 110 may be relative to the remaining fingers.

KMS 108 may also perform tests on the remaining fingers 220 to see how much each finger can bend vertically and/or reach horizontally. In an embodiment, KMS 108 may prompt the user 102 to use one finger or multiple fingers at a time. For example, multiple fingers 220 may be simultaneously tested for mobility or bendability measures.

KMS 108 may include various techniques for measuring or detecting the usability, mobility, or disability of user 102 as indicated by accessibility measure 110. One example of how to determine accessibility measure 110 may be displaying a black and white chessboard with medium granularity on an interactive interface (such as a touchscreen). In an embodiment, medium granularity may be displaying 1 inch×1 inch squares on a touchscreen interface. However, these measurements may vary in different embodiments and may vary based on the size of a touch screen where UIK 106 is to be displayed.

After the user has set his hand on initialization area 205, one of the squares of the rendered chessboard may change colors and the user 102 may be prompted to press the indicated square without lifting the hand from initialization area 205. In an embodiment, the prompt may include a prompt as to which finger is to be used to press the square, or may allow the user 102 to use any finger to press it. KMS 108 may determine whether user 102 was able to perform the requested action, how many tries it took, how long it took, and whether user 102 maintained or lost contact with initialization area 205 while performing the requested action(s).

As referenced above, the testing interface of KMS 108 may include an option that the user 102 may select if the user 102 is unable to reach the red square with any finger or the indicated finger. Or, for example, if the user 102 has not touched the indicated square upon the expiration of a timeout period (e.g., 3 seconds) KMS 108 may determine that the user 102 is unable access the indicated square due to finger mobility issues. In an embodiment, KMS 108 may track how many other locations on a touchscreen interface user 102 may have touched prior to touching the indicated square. For example, a number of previous touches may indicate that the user was trying and failing to touch the indicated square before finally succeeding, and may indicate finger mobility issues.

This process of changing the color of one or more of the squares and prompting a user 102 to touch the indicated square(s) may be repeated for different fingers in the user's hands, at different granularities, until KMS 108 may compute accessibility measure 110.

In an embodiment, a threshold 130 may indicate a number of consecutive correct square touches or based on user 102 exceeding a threshold 130 percentage of correctness. If user meets or exceeds threshold 130, KMS 108 may determine that the user 102 has full mobility based on the tested granularity. KMS 108 may then decreased the square granularity and test the user 102 again to determine the user's dexterity or finger mobility. In an embodiment, this process may be repeated until KMS 108 determines that the user has full mobility or until the user 102 fails at a particular granularity.

KMS 108 may test different granularities may be tested for a finger in different bendability areas or sections 220A-C based on user 102 performance. In an embodiment, if user 102 fails to meet threshold correctness requirement 130, the granularity of the squares may be increased and the user 102 may be tested again. This process may be repeated until user 102 passes threshold 130 for at least one granularity, or the largest granularity has been tested. In an embodiment, threshold 130 may indicate a number of incorrect touches or timeouts that require UIK 106 configuration (e.g., that fall out of an expected range of performance for user 102).

In another testing technique, KMS 108 may prompt user to place their palm on initialization area 205, and expand or extend their fingers as much as possible and/or place theirs fingers as close together as possible without overlapping. Then, for example, based on touchscreen interface, KMS 108 may determine the reach of the fingers of user 102.

KMS 108 may use any combination of testing techniques to compute or calculate accessibility measures 110. In an embodiment, accessibility measure 110 may be an area measure or value(s) corresponding to what portions of an interface (of touch screen device 104) are accessible to user 102 given a starting hand-placement point of 205. With regard to the fingers 220, accessibility measure 110 may indicate the furthest reach from and closest bend relative to initialization area 205. In another embodiment, accessibility measure 110 may indicate a length of fingers from the user's palm or from initialization area 205.

In an embodiment, KMS 108 may have a default map 114 corresponding to default measure 116. Default map 114 may indicate which keys of UIK 106 are accessible to which fingers of a user 102 who is determined to have full finger mobility or dexterity. Default map 114 may correspond to an initial arrangement or placement of keys for UIK 106. In an embodiment, default map 114 may be based on a standard of modified QWERTY keyboard arrangement. For example, those keys which are generally accessible the right index finger on a standard QWERTY keyboard, would be accessible to the right index finger in UIK 106 for default map 114.

Default measure 116 may indicate a baseline value or range of expected values for accessibility measure 110 for the various fingers being tested and may correspond to the test(s) that are administered. The baseline value or range of expected values may indicate an expected mobility or bendability of particular finger. In an embodiment, the extent to which accessibility measure 110 varies or falls outside the range of a corresponding default measure 116 may determine the extent to which KMS 108 alters accessibility map 112 (and UIK 106) for user 102 from default map 114. In an embodiment, the baseline value 116 may indicate which keys of a keyboard are normally accessible to each finger (e.g., of a user with full mobility).

Figure 3:
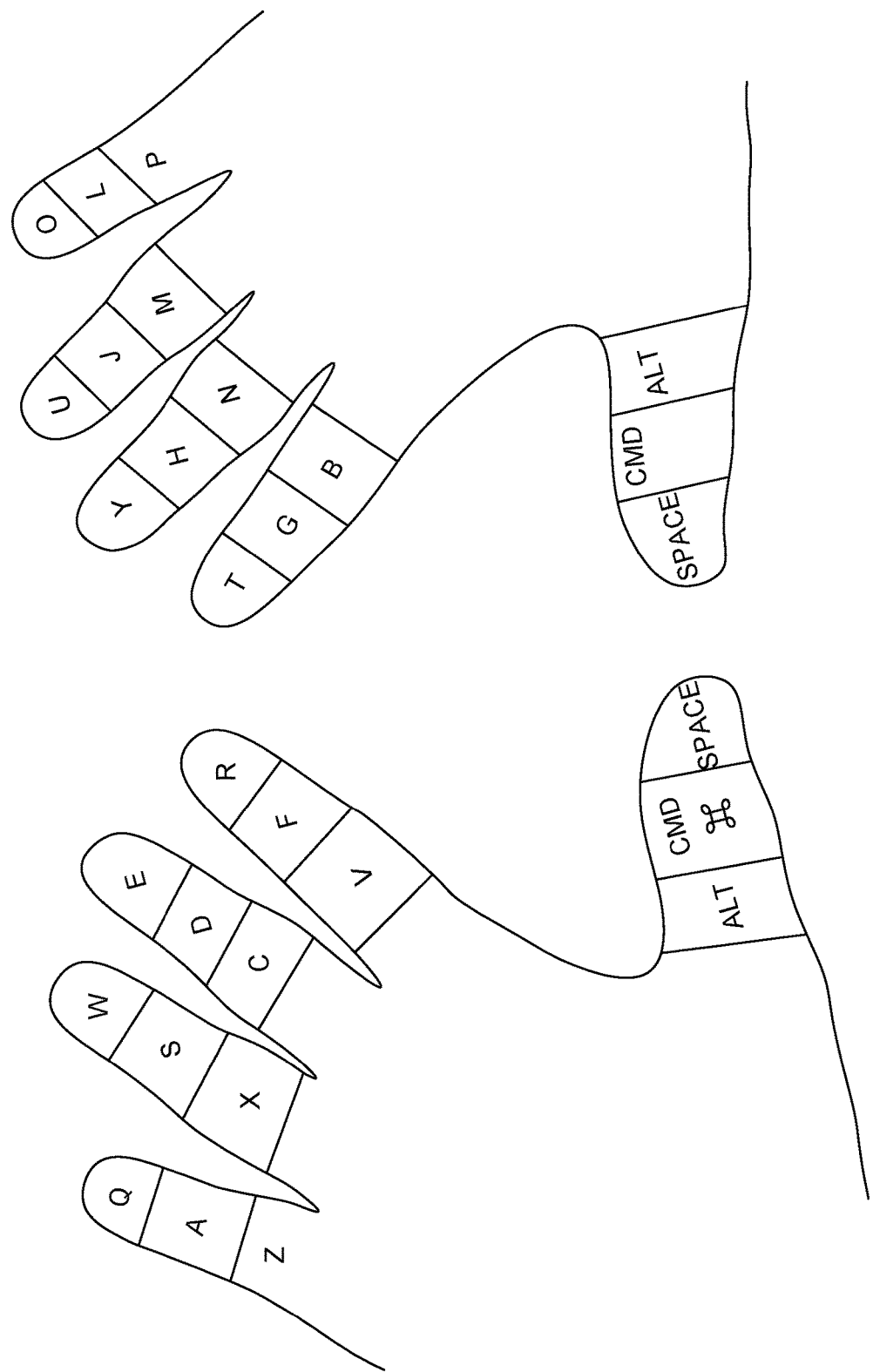
FIG. 3 illustrates a diagram of an example default accessibility map, according to an embodiment.

FIG. 3 illustrates a diagram of an example default accessibility map 114, according to an embodiment. Default map 114 shows which keys are accessible to which fingers based on default measure 116. As may be seen from the example, the arrangement of keys accessible to each finger may correspond to a standard QWERTY keyboard map. In other embodiments, other keyboard map arrangements, other than QWERTY may be used as well.

KMS 108 may use accessibility map 112 (including default map 114) to determine where on user interface to arrange various keys for UIK 106. In an embodiment, accessibility map 112 may indicate how much of a variance 120 (if any) exists between accessibility measure 110 for fingers of user 102 and a default or expected measure 116.

As referenced above, default measure 116 may indicate a range of expected values for accessibility measure 110, indicating full mobility and corresponding to using default map 114. KMS 108 may compare default measure 116 to accessibility measure 110 to calculate variance 120 which may indicate to what extent user 102 has extra mobility or limited mobility outside of the range of default measure 116. Based on variance 120, KMS 108 may determine accessibility map 112. For example, a finger with limited mobility or flexibility may be assigned fewer keys than indicated by default map 114. In an embodiment, variance 120 may be computed on a per-finger or per-hand basis for a user 102.

Figure 4:
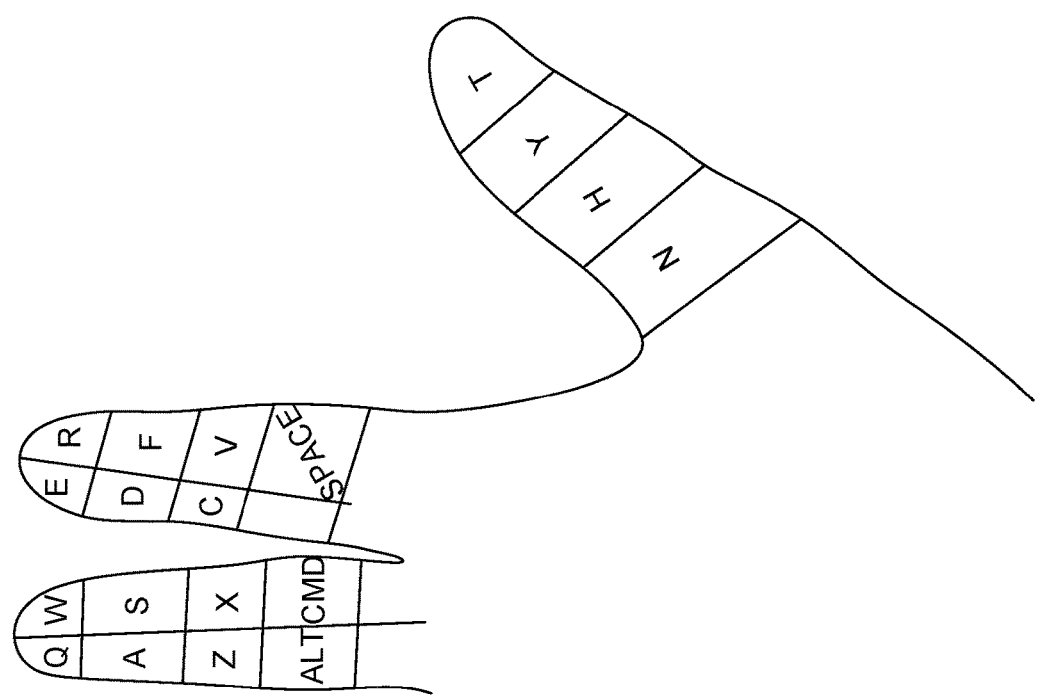
FIG. 4 illustrates a diagram of an example customized accessibility map, according to an embodiment.

FIG. 4 illustrates a diagram of an example customized accessibility map 112, according to an embodiment. In an embodiment, user 102 may be missing or have limited/no mobility in their left ring finger and pinky. KMS 108 may determine this variance 120 from default measure 116 based on the testing process described above. KMS 108 may then generate accessibility map 112 to account for variance 120.

As may be seen in the example of FIG. 4, the remaining fingers of left hand may be responsible for reaching or accessing more keys than in default accessibility map 114 as shown in FIG. 3. In another embodiment, key accesses normally assigned to the left hand may be shifted to fingers of the right hand based on variance 120. For example, if user 102 only has one finger on the left hand, then KMS 108 may assign more keys to the fingers of the right hand, rather than making the single left hand finger responsible for all the keys normally assigned to the left hand.

In an embodiment, KMS 108 may customize or further configure accessibility map 112 and the display of UIK 106 based on key preferences 118 provided by user 102. KMS 108 prompt user 102 to type various letters, words, sentences, or other alphabetic, numeric, or alpha-numeric combinations using an initially configured UIK 106. Based on how accurately and/or quickly a responds to the prompts, KMS 108 may adjust accessibility map 112 or the display (size, arrangement, ordering) of keys of UIK 106.

In an embodiment, KMS 108 may display UIK 106 or accessibility map 112 on an interface of device 104. KMS 108 may then allow or prompt user to adjust how user 102 prefers accessibility map 112 or UIK 106 to appear. For example, user 102 may use a drag-and-drop operation to adjust the display of UIK 106. KMS 108 may then save the user's indication in key preferences 118 and adjust accessibility map 112 accordingly.

Key preferences 118 may include any key preferences that are outside of a default set of keys available or arrangement or display of keys particular to user 102. Key preferences 118 may be provided by user 102, and/or may be determined based on which application(s) of computing device 104 are active or are receiving input from UIK 106. For example, a financial application may include currency key assignments which may be frequently used with the financial application, and which may be displayed in UIK 106. The currency key assignments may be provided in addition to the standards QWERTY keys or in lieu of some of the QWERTY keys. Or, for example, a user who uses Greek lettering may choose to configure key preferences 118 to include one or more selectable Greek letters.

In an embodiment, KMS 108 may enable user 102 to configure and/or switch between multiple UIKs 106 which have been configured based on accessibility map 112. For example, while alphabetic keys are shown in the map 114 of FIG. 3. In other embodiments, different keyboard maps may be used. For example, UIK 106 may display keys corresponding to numbers, currency, Greek letters, or other key maps in different languages. In an embodiment, user 102 may indicate which key maps to configure in key preferences 118. In an embodiment, KMS 108 may configure each UIK 106 for the different key preferences 118 based on a base accessibility map 112. However, user may individually configure and adjust each associated UIK 106. In a given session, user 102 may toggle or switch between different keyboard maps with different sets of keys.

Figure 5:
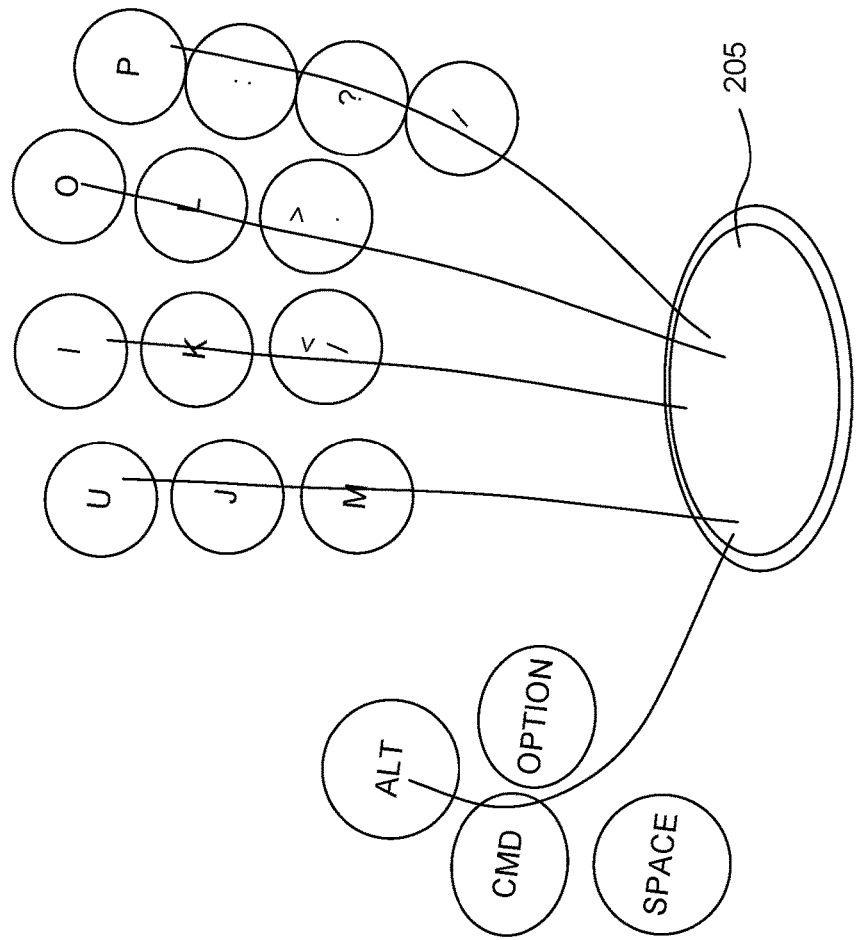
FIG. 5 illustrates a diagram of an example customized user interface keyboard (UIK), according to an embodiment.

FIG. 5 illustrates a diagram of an example customized user interface keyboard (UIK) 506, according to an embodiment. UIK 506 shows an example of a digital rendering (e.g., on a touchscreen interface or light rendering) of a UIK 106 that has been configured based on an accessibility map 112.

In an embodiment, UIK 506 may not visually display initialization area 205. As noted above, initialization area 205 indicates a position of where a user's palm is anticipated to be on or relative to the user interface. The lines extending from 205 are representative of accessibility map 112 and show which keys are accessible with which user fingers (and may not be displayed).

In another embodiment, if the user's right index finger had limited bendability or flexibility, then the "M" key may be positioned next to the "U" key instead of underneath the "J" key. Or, for example, "M" may be made accessible to the pinky. Which keys are accessible to which fingers may be customized on a per-user and/or per-application basis.

In an embodiment, the rendering of UIK 506 may account for an angular placement of user's palm on initialization area 205. For example, based on which portion(s) of a touchscreen interface of device 104 is contacted relative to initialization area 205, the angles at which the keys are displayed may vary across different users. For example, KMS 108 may provide two users 102 with full mobility different UIKs 506 based on their preference hand placement angles.

Figure 6:
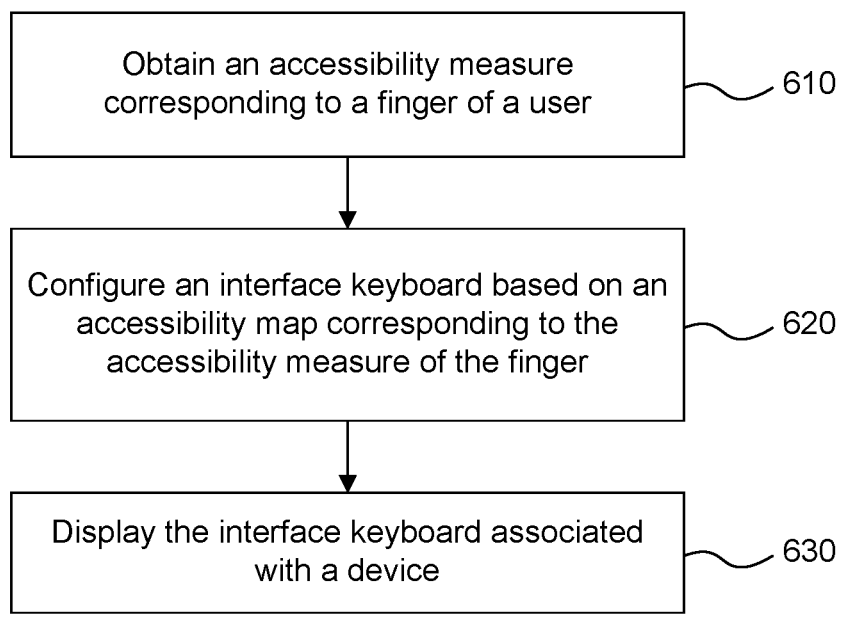
FIG. 6 is a flowchart illustrating a process for providing an ergonomic keyboard user interface, according to some embodiments.

FIG. 6 is a flowchart illustrating a process 600 for providing an ergonomic keyboard user interface, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

At 610, an accessibility measure corresponding to a finger of a user is obtained. For example, KMS 108 may receive an indication from user 102 that the user has limited mobility in one or more fingers. KMS 108 may then test user 102 to determine the extent of the limitation and compute accessibility measure 110 for one or more of the fingers, including the finger with limited mobility and/or one or more of the other fingers. Accessibility measure 110 may indicate or correspond to how many keys of a keyboard are accessible to the respective finger(s). In an embodiment, accessibility measure 110 may indicate a variance 120 from an expected or default measure 116. Variance 120 may indicate which keys that are normally accessible to a particular finger with full mobility are not accessible to a corresponding finger of the user 102.

At 620, an interface keyboard is configured based on an accessibility map corresponding to the accessibility measure of the finger. For example, KMS 108 may determine an accessibility map 112 corresponding the accessibility measures 110 of user 102. In an embodiment, accessibility map 112 may indicate or account for a variance 120 from default map 114. Default map 114 may indicate a predetermined set of keys is accessible to one or more of the fingers based on default measure 116. Accessibility map 112 may indicate any variance 120 from default 114.

At 630, the interface keyboard associated with a device is displayed. For example, computing device 104 may display UIK 106 or UIK 106 may be projected on another surface. In an embodiment, KMS 108 may allow a user to test UIK 106 and further configure the appearance of UIK 106 or provide key preferences 108. Then, for example, when user 102 logs in to use computing device 104, the customized or configured UIK 106 may automatically be provided for user 102. KMS 108 may also change which UIK 106 is displayed based on which application is active on computing device 104.

Figure 7:
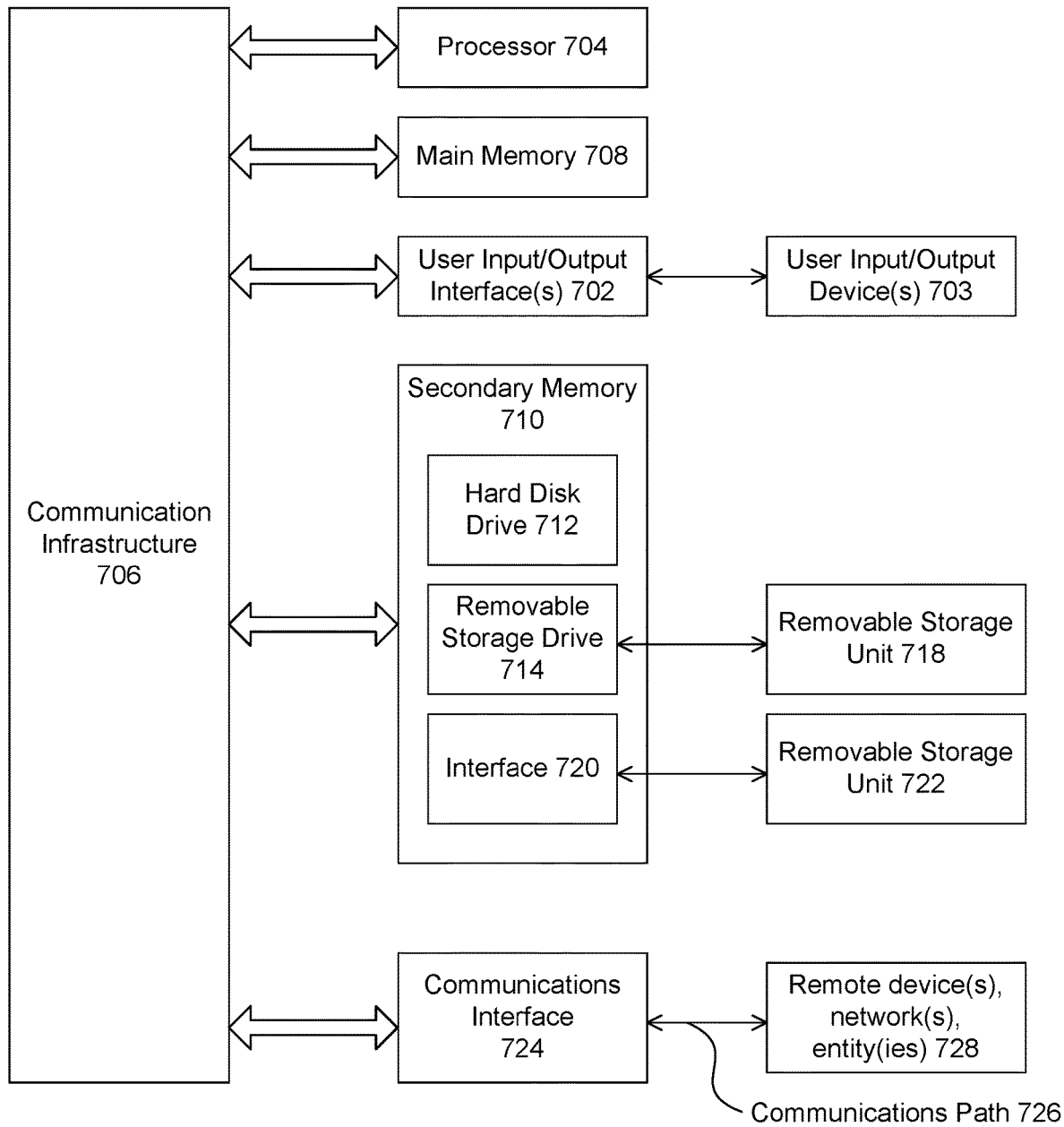
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
    determining a baseline keyboard interface corresponding to a baseline mobility of a finger of a user;
    receiving an indication that the finger of the user has sustained an injury with an expected recovery time;
    measuring a new mobility of the finger of the user with the injury;
    determining a deviation between the new mobility and the baseline mobility of the finger;
    configuring an injury keyboard interface comprising shifting a plurality of keys of the baseline keyboard interface to new positions away from the finger with the injury and towards another finger without the injury based on the deviation; and
    displaying the injury keyboard interface comprising the shifted plurality of keys during the expected recovery time, wherein upon an expiration of the expected recovery time the baseline keyboard interface is displayed.

2. The method of claim 1, wherein the measuring comprises:
    measuring a forward and back bendability of the finger of the user with the injury; and
    measuring a lateral mobility of a thumb of the user.

3. The method of claim 1, wherein the determining the deviation comprises:
    displaying a set of a plurality of squares on a touchscreen interface;
    changing a color of a square of the plurality of squares; and
    determining the new mobility of the finger of the user with the injury based on whether the square was touched.

4. The method of claim 3, wherein the determining the new mobility of the finger comprises:
    determining that a timeout period to touch the square has expired without detecting that the square was touched.

5. The method of claim 1, further comprising:
    displaying a first set of squares of a first size;
    detecting a first set of one or more user responses to changing colors of one or more squares of the first set of squares;
    displaying a second set of squares of a second size different from the first size;
    detecting a second set of one or more user responses to changing colors of one or more squares of the second set of squares; and
    measuring the new mobility of finger of the user with the injury based at least in part on both the first set of responses and the second set of responses.

6. The method of claim 1, wherein the configuring comprises:
    determining, based on the accessibility measure, that the finger of the user with the injury has limited mobility or bendability; and
    arranging the set of keys such that the finger with limited mobility or bendability is assigned fewer keys than another one of the plurality of fingers with greater mobility or bendability than the finger of the user with the injury.

7. The method of claim 6, wherein the determining, based on the accessibility measure, that the finger of the user with the injury has limited mobility or bendability, comprises:
    comparing the accessibility measure of the finger to the baseline value indicating an expected mobility or bendability of the finger to determine a variance, wherein the variance corresponds to a measure of the limited mobility or bendability of the finger.

8. The method of claim 1, wherein the configuring comprises:
    determining an angle of a hand placement of the user; and
    arranging the shifted plurality of keys based at least in part on the hand placement.

9. A system, comprising:
    a memory; and
    at least one processor coupled to the memory and configured to perform operations comprising:
    determining a baseline keyboard interface corresponding to a baseline mobility of a finger of a user;
    receiving an indication that the finger of the user has sustained an injury with an expected recovery time;
    measuring a new mobility of the finger of the user with the injury;
    determining a deviation between the new mobility and the baseline mobility of the finger;
    configuring an injury keyboard interface comprising shifting a plurality of keys of the baseline keyboard interface to new positions away from the finger with the injury and towards another finger without the injury based on the deviation; and
    displaying the injury keyboard interface comprising the shifted plurality of keys during the expected recovery time, wherein upon an expiration of the expected recovery time the baseline keyboard interface is displayed.

10. The system of claim 9, wherein the measuring comprises:
    measuring a forward and back bendability of the finger of the user with the injury; and
    measuring a lateral mobility of a thumb of the user.

11. The system of claim 9, wherein the determining the deviation comprises:
    displaying a set of a plurality of squares on a touchscreen interface;

changing a color of a square of the plurality of squares; and determining the new mobility of the finger of the user with the injury based on whether the square was touched.

12. The system of claim 11, wherein the determining the new mobility of the finger comprises:

determining that a timeout period to touch the square has expired without detecting that the square was touched.

13. The system of claim 9, the one or more operations further comprising:

displaying a first set of squares of a first size;

detecting a first set of one or more user responses to changing colors of one or more squares of the first set of squares;

displaying a second set of squares of a second size different from the first size;

detecting a second set of one or more user responses to changing colors of one or more squares of the second set of squares; and measuring the new mobility of finger of the user with the injury based at least in part on both the first set of responses and the second set of responses.

14. The system of claim 9, wherein the configuring comprises:

determining, based on the accessibility measure, that the finger of the user with the injury has limited mobility or bendability; and arranging the set of keys such that the finger with limited mobility or bendability is assigned fewer keys than another one of the plurality of fingers with greater mobility or bendability than the finger of the user with the injury.

15. The system of claim 14, wherein the determining, based on the accessibility measure, that the finger of the user with the injury has limited mobility or bendability, comprises:

comparing the accessibility measure of the finger to the baseline value indicating an expected mobility or bendability of the finger to determine a variance, wherein the variance corresponds to a measure of the limited mobility or bendability of the finger.

16. The system of claim 9, wherein the configuring comprises:

determining an angle of a hand placement of the user; and arranging the shifted plurality of keys based at least in part on the hand placement.

17. A non-transitory computer-readable device having instructions stored on a memory thereon that when executed by at least one processor of the device, causes the at least one processor to perform operations comprising:

determining a baseline keyboard interface corresponding to a baseline mobility of a finger of a user;

receiving an indication that the finger of the user has sustained an injury with an expected recovery time;

measuring a new mobility of the finger of the user with the injury;

determining a deviation between the new mobility and the baseline mobility of the finger;

configuring an injury keyboard interface comprising shifting a plurality of keys of the baseline keyboard interface to new positions away from the finger with the injury and towards another finger without the injury based on the deviation; and displaying the injury keyboard interface comprising the shifted plurality of keys during the expected recovery time, wherein upon an expiration of the expected recovery time the baseline keyboard interface is displayed.

18. The device of claim 17, wherein the measuring comprises:

measuring a forward and back bendability of the finger of the user with the injury; and measuring a lateral mobility of a thumb of the user.

19. The device of claim 17, wherein the determining the deviation comprises:

displaying a set of a plurality of squares on a touchscreen interface;

changing a color of a square of the plurality of squares; and determining the new mobility of the finger of the user with the injury based on whether the square was touched.

20. The device of claim 19, wherein the determining the new mobility of the finger comprises:

determining that a timeout period to touch the square has expired without detecting that the square was touched.

\* \* \* \* \*